Jan. 26, 1965   F. WÖSSNER   3,167,309
HYDROPNEUMATIC SHOCK ABSORBER FOR AUTOMOTIVE VEHICLES
Filed Feb. 8, 1961
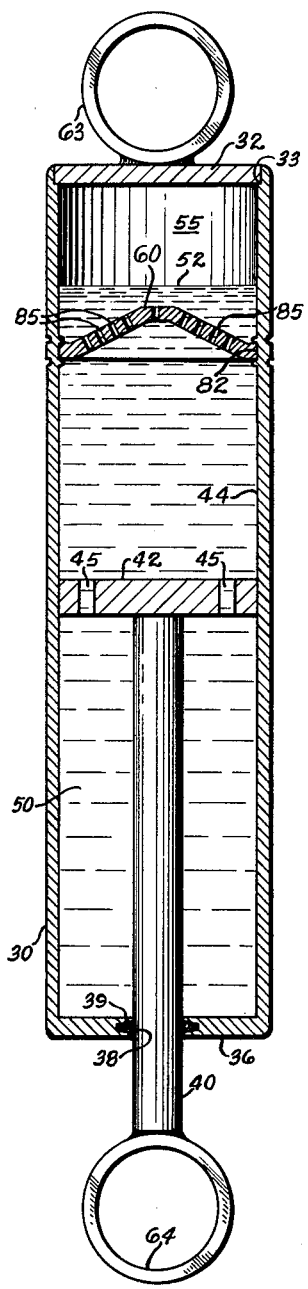
INVENTOR:
FELIX WÖSSNER
By
Richardson, David and Nordon
ATT'YS.

United States Patent Office 3,167,309
Patented Jan. 26, 1965

3,167,309
HYDROPNEUMATIC SHOCK ABSORBER FOR
AUTOMOTIVE VEHICLES
Felix Wössner, Schweinfurt (Main), Germany, assignor to
Fichtel & Sachs A.G., Schweinfurt (Main), Germany,
a corporation of Germany
Filed Feb. 8, 1961, Ser. No. 87,848
Claims priority, application Germany, Feb. 9, 1960,
F 30,494
1 Claim. (Cl. 267—64)

The present invention concerns a hydropneumatic telescopic shock absorber, particularly adapted for use in automotive vehicles.

The shock absorber includes a cylinder closed at both ends. The cylinder contains a damping liquid such as oil and an inert gas under pressure. A piston rod passes axially through one end of the cylinder and carries a piston. The piston fits axially in the cylinder and is provided with a plurality of axial passages or holes which permit the liquid to flow through when the piston is moved in the cylinder.

A principal difficulty encountered with such a shock absorber is that jets of the damping liquid are forced through the holes in the piston and into the space occupied by the compressed gas when the piston rod is pulled outwardly of the cylinder. Strong eddies of liquid are produced which break up into masses of bubbles or foam in the space above the piston. With continued operation of the shock absorber and rapid reciprocation of the piston rod, the entire interior of the cylinder becomes filled with a homogeneous foamy mass of small bubbles containing the gas. This foamy mass has inferior shock absorbing and damping qualities as compared with the original liquid. Also, undesirable hissing noises are produced as the piston and piston rod reciprocate in the cylinder. Overall operating efficiency of the shock absorber is thus much reduced.

It has been proposed to provide an auxiliary cylindrical piston in the cylinder, provided with a flexible rubber sealing ring fitted into a groove in the cylindrical wall of the piston. The piston separates the liquid and gas in the cylinder. The ring acts as a packing member. This expedient has not proven successful because the rubber ring wears and loses its snug fit. Also the rubber deteriorates in the oily liquid employed as the damping fluid.

Since the auxiliary piston reciprocates axially in the cylinder, it is necessary to lengthen the cylinder to accommodate this movement. In the limited space under an automotive vehicle, this extra length is not desirable.

It has been further proposed to employ flexible rubber bellows in the cylinder of the shock absorber to separate the gas under pressure from the damping liquid. Such bellows have not been successful because the gas under pressure penetrates and passes through the relatively thin walls of the bellows. The elevated temperatures of the liquid and gas in the shock absorber deteriorate the rubber so that the bellows soon stiffen, crack and become inoperative.

It has also been proposed to provide stationary disks in the cylinder of the shock absorber to separate the liquid and gas. Valves are fitted into the disks to control damping action and equalize the volumes in the cylinder which are changed as the piston rod moves into and out of the cylinder. This expedient has not proven successful because it does not prevent the formation of foam in the cylinder. With continued operation the entire cylinder becomes filled with the objectionable foam. Furthermore, the valves are expensive and complicated and frequently wear out or go out of order.

The present invention is directed at overcoming the above mentioned and other difficulties and to provide an improved shock absorber of greater simplicity in structure, lower cost and greater reliability in operation.

A further object is to provide a shock absorber having a jet impact barrier member disposed in the damping liquid inside the cylinder of a shock absorber and spaced from an axial reciprocated piston, the barrier member being rigidly mounted and provided with passages permitting the liquid to flow therethrough while preventing the passage of jets of liquid into the compressed air space.

Another object is to provide a shock absorber with a jet impact and barrier member to suppress the violently moving jets of liquid passing through holes in a reciprocated piston, thus preventing the formation of foam and objectionable hissing sounds.

In operation, the jet impact member permits the liquid to pass into the space occupied by the compressed gas by free flow. The gas compresses and expands as the piston rod moves in and out of the cylinder to compensate for the variable volume occupied by the piston rod in the cylinder. The jet barrier member is relatively simple in structure, inexpensive, durable, unresponsive and insensitive to high temperature and not subject to wear, deterioration or malfunction.

Various objects, features and advantages of the invention will become apparent upon reading the following specification together with the accompanying drawing forming a part thereof.

In the drawing, the single figure is a view in axial section of a shock absorber embodying the invention.

In the drawing, identical reference numerals are applied to corresponding parts throughout the various embodiments of the invention.

The drawing shows a shock absorber including a cylinder 30 which is closed at its upper end by a circular end wall 32. The end wall 32 is secured by welding or the like in a seat 33 formed in the upper end portion of the cylinder. The cylinder 30 has an integrally formed lower end wall 36. An aperture or hole 38 is formed in the lower end wall 36. A piston rod 40 passes longitudinally slidably through the hole 38. Suitable packing or sealing means 39 is provided at hole 38 to insure a liquid-tight seal between the rod 40 and the end wall 36. The piston rod 40 is coaxial with the cylinder 30. At its upper end, the piston rod 40 carries a circular piston 42 the periphery of which is snugly fitted to slide along the inner wall surface 44 of the cylinder 30. The piston 42 is provided with a plurality of circularly spaced holes 45 which extend axially through the piston. Disposed in the cylinder 30 is a predetermined quantity of a suitable liquid 50 such as oil. The holes 45 are continuous and free from obstructions so that the liquid 50 may flow freely through the holes 45 during reciprocation of the piston 42. Above the upper surface 52 of the liquid 50 is a space 55 in which a suitable inert compressed gas is confined. Immersed in the liquid is a jet barrier or impact member 60 having the form of a fixed conical plate or screen formed of sheet material. The impact member 60 is shown immersed in the liquid 50. The impact member 60 has apertures 85 formed therein which define elongated passages extending directly through the sheet material perpendicularly with respect to the surfaces thereof. The central portion of the impact member 60 is upwardly convergently frusto-conically dished so that the axes of the apertures 85, which are radially spaced from the longitudinal axis of the cylinder 30, are obliquely inclined with respect to the longitudinal axis of the cylinder 30.

The impact member 60 is peripherally connected to the cylinder 30, being rigidly secured in a groove 82 formed in the inner side 83 of the cylinder 30. All of the apertures 85 are positioned out of alignment with the holes 45 in the piston 42. The impact member 60 thus permits free passage of the liquid 50 therethrough at low velocity while obstructing the passage therethrough of any high velocity jets from the holes 45 of the piston 42 produced by high velocity downward movement of the piston 42, which jets would, if not obstructed, cause the formation of foam on the upper surface of the liquid 50.

The shock absorber is shown provided with an upper ring 63 attached to the upper end wall 32 and a lower ring 64 attached to the lower end of the piston rod 40. The rings 63 and 64 permit the shock absorber to be mounted vertically and connected between the vehicle body and an axle or other body part the vibrations of which are to be damped or from which mechanical shocks are to be absorbed.

It will be apparent to those skilled in the art that various modifications may be made in the embodiment which has been shown and described without departing from the spirit and scope of the invention as defined in the appended claim.

I claim:

A hydropneumatic shock absorber comprising a hollow cylinder closed at both ends;

a quantity of a liquid disposed in the lower portion of said cylinder and a quantity of a gas disposed within said cylinder and above said liquid, said liquid and said gas together substantially completely filling said cylinder;

a cylindrical piston axially movable in said cylinder and immersed in said liquid;

a reciprocable piston rod coaxial with said cylinder and connected to said piston, said piston rod extending axially outwardly of said cylinder in a liquid-tight manner through the lower end thereof, said piston having at least one axially extending hole formed therein which permits the flow of said liquid therethrough during axial reciprocation of said piston within said cylinder; and an impact member at least partially immersed in said liquid and peripherally connected to said cylinder, said impact member being formed of sheet material having apertures formed therein defining elongated passages the axes of which are radially spaced from the longitudinal axis of said cylinder and which extend directly through said sheet material perpendicularly with respect to the surfaces thereof, the central portion of said impact member being frusto-conically dished whereby the axes of said apertures are obliquely inclined with respect to the longitudinal axis of said cylinder, all of said apertures being positioned out of alignment with said hole in said piston, said impact member permitting free passage of said liquid therethrough at low velocity while obstructing the passage through said impact member of any high velocity jet of liquid produced by high velocity downward movement of said piston which jet would, if not obstructed, cause the formation of foam on the upper surface of said liquid.

References Cited by the Examiner

UNITED STATES PATENTS

| | | | |
|---|---|---|---|
| 1,457,122 | 5/23 | Ree | 267—64 |
| 1,775,349 | 9/30 | Kaun | 188—100 |
| 2,439,349 | 10/44 | Tack et al. | |
| 2,451,171 | 10/48 | Mullen | 267—64 |
| 2,483,429 | 10/49 | Pierce | 267—64 |
| 2,719,611 | 10/55 | De Previnquieres | 188—88 |
| 2,721,074 | 10/55 | Bourcier De Carbon | 267—64 |
| 2,823,915 | 2/58 | Bourcier De Carbon | 267—64 |
| 2,939,696 | 6/60 | Tuzek | 267—64 |
| 3,078,965 | 2/63 | Bourcier De Carbon et al. | 188—88 |

FOREIGN PATENTS 296,897　9/28　Great Britain.

ARTHUR L. LA POINT, *Primary Examiner.*

RICHARD A. DOUGLAS, ROBERT C. RIODON, *Examiners.*